United States Patent [19]
Katsumaru et al.

[11] Patent Number: 5,625,675
[45] Date of Patent: Apr. 29, 1997

[54] VOICE MAIL COMMUNICATION SYSTEM

[75] Inventors: Ikuko Katsumaru, Machida; Junji Fukuzawa, Sagamihara; Masato Terada, Sagamihara; Osamu Takada, Sagamihara, all of Japan

[73] Assignee: Hitachi, Ltd., Tokyo, Japan

[21] Appl. No.: 500,690

[22] Filed: Jul. 11, 1995

[30] Foreign Application Priority Data

Jul. 14, 1994 [JP] Japan .................................. 6-161811

[51] Int. Cl.⁶ .................................................. H04M 1/64
[52] U.S. Cl. .................................. 379/67; 379/89; 379/84
[58] Field of Search ............................... 379/67, 88, 89, 379/84, 207, 94; 370/61

[56] References Cited

U.S. PATENT DOCUMENTS

| | | | |
|---|---|---|---|
| 4,853,952 | 8/1989 | Jachmann et al. | 379/89 |
| 4,935,954 | 6/1990 | Thompson et al. | 379/96 |
| 5,029,200 | 7/1991 | Haas et al. | 379/207 |
| 5,274,696 | 12/1993 | Perelman | 379/89 |
| 5,333,266 | 7/1994 | Boaz et al. | 395/200 |
| 5,351,276 | 9/1994 | Doll, Jr. et al. | 379/67 |
| 5,375,068 | 12/1994 | Palmer et al. | 364/514 |
| 5,384,829 | 1/1995 | Heileman, Jr. et al. | 379/67 |
| 5,406,557 | 4/1995 | Baudoin | 379/89 |
| 5,414,762 | 5/1995 | Flisik et al. | 379/94 |
| 5,440,624 | 8/1995 | Schoff, II | 379/201 |
| 5,450,488 | 9/1995 | Pugalzewski et al. | 379/67 |
| 5,487,103 | 1/1996 | Richardson, Jr. et al. | 379/88 |
| 5,497,373 | 3/1996 | Hulen et al. | 379/79 |

OTHER PUBLICATIONS

Fujitsu Journal, vol. 19, No. 2, 1993, pp. 67 and 68.

*Primary Examiner*—Krista M. Zele
*Assistant Examiner*—Daniel S. Hunter
*Attorney, Agent, or Firm*—Fay, Sharpe, Beall, Fagan, Minnich & McKee

[57] ABSTRACT

The voice mail system includes a voice mail exchanger and a mail server. A voice mail communication between a telephone and a terminal device, such as a client computer, is registered in a LAN based multi-media mail box. A PBX based voice mail apparatus and a LAN based multi-media mail system are integrated such that voice information can be commonly used and reused.

11 Claims, 14 Drawing Sheets

| [MAIL SENDER] | [RECEPTION DATE] | [ATTACHED INFORMATION] |
|---|---|---|
| 1. Terada | Mon Oct. 25 10:17 | Hitachi |
| 2. Tele. Serv | Mon Oct. 25 20:50 | Voice Mail from Outline |
| 3. Katsuma | Tue Nov. 30 09:59 | Translation |
| 4. Tele. Serv | Tue Nov. 30 15:32 | Voice Mail from 3425 |
| 5. Tele. Serve | Tue Nov. 30 18:11 | Voice Mail from Outline |

FIG. 12

| KIND OF ATTRIBUTE | ATTRIBUTE VALUE |
|---|---|
| USER IDENTIFIER | |
| MAIL ACCESS CONTROL INFORMATION | |
| TELEPHONE NUMBER | |
| KIND OF TELEPHONE | |
| TELEPHONE ADDRESS | |

| KIND OF ATTRIBUTE | ATTRIBUTE VALUE |
|---|---|
| TELEPHONE NUMBER | |
| MAIL ACCESS CONTROL INFORMATION | |

VOICE MAIL COMMUNICATION SYSTEM

BACKGROUND OF THE INVENTION

1. Field of the Invention

The present invention relates to a voice mail system and a voice mail exchanger and more particularly to an integrated mail system and a voice mail exchanger which can exchange voice messages between a user of a computer applied device (terminal device), having a voice communication function, and a user of a general telephone connected to a switch.

2. Description of the Prior Art

As a conventional mail system which can handle voice information, a voice mail apparatus attached to a PBX for taking in telephones and a mail server for text or multimedia including an image using a calculator applied device represented by a personal computer or a workstation as a terminal are known.

A voice mail apparatus is a mail system attached to a PBX and a user of each telephone taken in the PBX transmits or receives a voice message via the voice mail apparatus. For example, when a communication partner is absent, a user of a telephone makes a telephone call to the mail box of the communication partner and registers a voice message in the voice mail apparatus. A user who is a destination of the voice mail accesses the voice mail apparatus using an interface which is intrinsic to the telephone such as operating a push button so as to fetch the message from the mail box and can hear it via the telephone.

On the other hand, a mail server is a system used to transmit or receive messages between users of personal computers or workstations connected to a LAN and as multimedia personal computers and multi-media workstations have appeared, a multi-media mail system which can transmit and receive voice and image messages in addition to text messages has been developed.

An example of an office system integrating a telephone based voice communication system and a LAN based data communication system is described in Fujitsu Journal, Vol. 19, No. 2, 1993, pp. 67 and 68.

In the system described in the aforementioned literature, each user uses a telephone and a personal computer together, performs voice communication using the telephone, and registers a voice message in a voice mail apparatus. The user transmits or receives multimedia mails using the personal computer.

In this system, a list of the voice mails received by the voice mail apparatus can be displayed on the screen of a personal computer. When a user designates a voice mail to be received on the screen of the personal computer, the system rings a bell of the nearest telephone and outputs the message to this telephone. Reception of multi-media mails is indicated by a reception lamp attached to the telephone and the voice mail can be heard from the voice output device of the personal computer.

Although the aforementioned general voice mail apparatus is an effective means in smooth proceeding of transfer of a voice message, operations such as mail registration, reception, and cancel are performed by an interface which is based on an intrinsic button operation of the telephone, so that there is a problem imposed in the operability and the apparatus is not fully utilized actually.

On the other hand, a multi-media mail system is comparatively inexpensive and excellent in operability because a mail operation can be performed by using a GUI (graphical user interface) of a personal computer. Since voice information and image information can be managed in a file format, they can be shared and reused easily between application programs at each terminal device.

However, in the aforementioned conventional integrated office system, although integration of telephone based voice communication service and LAN based data communication service is realized, the voice mail apparatus for handling voice mails and the multi-media mail system for handling multi-media mail are independently mounted and it is necessary for a user to select properly one of these two mail systems.

Since the voice information is distributed to and managed by the voice mail apparatus and the multi-media mail system, a problem arises in that all of the voice information cannot be shared or reused between the application programs.

SUMMARY OF THE INVENTION

An object of the present invention is to provide a voice mail system which can be accessed from both a general telephone and a telephone terminal device connected to a LAN.

Another object of the present invention is to provide an integrated mail system in which a PBX based voice mail apparatus and a LAN based multi-media mail system are integrated.

Still another object of the present invention is to provide a voice mail exchanger which can to share and reuse a PBX based voice mail and a LAN based voice mail.

To accomplish the above objects, the voice mail communication system of the present invention comprises a signal transmission line, a plurality of terminal devices having a voice mail communication function which are connected to the signal transmission line, a mail server which is connected to the transmission line and stores a plurality of voice mails and manages the addresses of the voice mails, a switch for exchanging voice signals of at least a plurality of telephones, and a voice mail exchanger which is connected to the switch and the transmission line and converts a connection protocol of at least one of the telephones to a voice mail connection protocol and communicates the converted voice mail at least with the mail server and at least one of the terminal devices.

The voice mail exchanger of the present invention is a voice mail exchanger which has an interface connected to a switch for taking in a plurality of telephones and an interface having a voice I/O function connected to a LAN including a plurality of terminal devices and enables communication between the telephones on the switch side and the terminal devices on the LAN side, wherein the voice mail exchanger includes a converting means for converting a connection protocol from a telephone on the switch side to a connection protocol between the terminal devices on the LAN side, a switching means for switching the connection protocol from the aforementioned telephone on the switch side to voice mail protocol processing, a converting means for converting a telephone number to mail control information, and a sending means for sending the voice information from the aforementioned telephone to the mail server connected to the LAN as a voice mail by the mail control information.

More concretely, in the voice mail system of the present invention, a plurality of computers (terminal devices) having a voice I/O function and the mail server are connected to each other with the LAN, and each terminal device stores a voice mail for an answering machine and another text or multi-media mail in the same mail box via the mail server, and a mail of an optional medium can be fetched from each terminal device.

In the voice mail system of the present invention, the PBX is connected to the LAN via the voice mail exchanger, and the signal form or protocol of voice and mail transmitted and received between the telephones on the PBX side and the terminal devices on the LAN side is converted by the voice mail exchanger, and voice mails for an answering machine from the telephones on the PBX side can be stored in the mail box of the mail server connected to the LAN.

The voice mail exchanger of the present invention includes, for example, a voice communication means on the LAN for performing voice communication between the exchanger and a computer (terminal device) connected to the LAN, a connection control means for converting a connection signal for controlling the PBX to the voice communication procedure on the LAN, an address converting means for converting a telephone number to a computer address on the LAN, and a voice format converting means during communication for converting between the voice information format on the telephone line and the voice information format on the LAN and sets a call between a general telephone, the voice mail apparatus, and an application program on the computer.

In another embodiment of the voice mail exchanger of the present invention, the exchanger has an automatic voice mail operation switching means for deciding absence of a user or a communication disabled state and setting a call by automatically switching the communication processing to the voice mail processing and the linked processing from communication to voice mail operation can be performed in the user absence state or communication disabled state.

In still another embodiment of the voice mail exchanger of the present invention, the exchanger has a voice format converting means during storing for converting between the voice information format on the LAN and the voice information format which can use an application program, a request interpretation means for interpreting user input information, a mail address converting means for converting a telephone number to a mail address, and a mail operating means to an existing mail system and a voice mail operation can be performed from a general telephone.

The present invention having the aforementioned constitution has the following operation and function.

According to the present invention, voice mails for an answering machine and other mails handled by a LAN terminal are stored in the same mail box. Therefore, these mails can be handled in a unified manner from each terminal device and voice mails can be fetched easily.

In the voice mail exchanger of the present invention, when a connection request to a computer on the LAN is received from a general telephone, the communication procedure can be converted by the connection control means and the call setting processing with a LAN terminal (computer) can be performed by the address converting means and the voice communication means on the LAN. When the LAN terminal to be received cannot reply, the processing can be transferred to the voice mail registration into the main box by the automatic voice mail operation switching means and the voice information from a general telephone registered in the mail box can be fetched at any time from the terminal device on the LAN side.

Furthermore, when the voice mail exchanger receives a connection request to the voice mail apparatus from the terminal on the LAN side, by converting the communication procedure by the connection control means, performing the call setting processing with the PBX, and converting the voice format, a voice mail can be registered in the voice mail appratus of the telephone on the PBX side from the appatus on the LAN side.

The foregoing and other objects, advantages, manner of operation and novel features of the present invention will be understood from the following detailed description when read in connection with the accompanying drawings.

BRIEF DESCRIPTION OF THE DRAWINGS

FIG. 12 is a drawing showing the constitution of the directory in the second embodiment.

DETAILED DESCRIPTION OF THE PREFERRED EMBODIMENTS

The embodiments of the present invention will be explained hereunder with reference to the accompanying drawings.

Embodiment 1

A system for performing both telephone type real time voice communication and store type voice communication on the LAN using a computer (LAN based telephone system) including a voice I/O device will be explained. In this system, a mail server connected to the LAN as a mail system for recording an answering machine is used and a mail for an answering machine sent to a user of this system from a user of a general telephone is registered in the mail server on the LAN.

Figure 1:
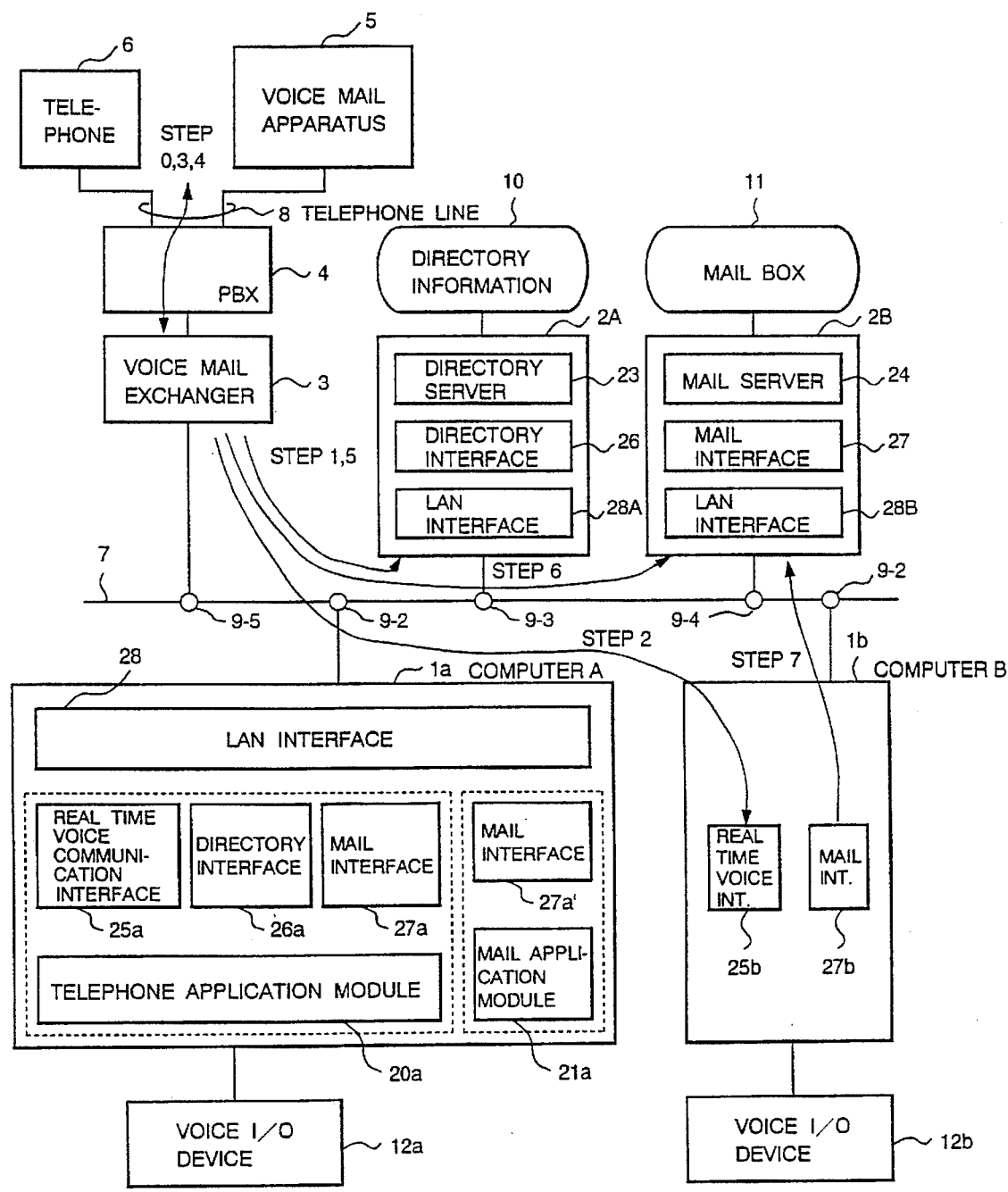
FIG. 1 is a system block diagram showing a first embodiment of the voice/data integrated communication system of the present invention.

FIG. 1 shows the constitution of the voice/data integrated office communication system.

A numeral 1 (1a, 1b, - - - ) indicates client computers which can perform voice communication and 12 (12a, 12b) indicates voice I/O devices installed in the client computers 1 and each client computer 1 inputs and outputs voice via each of the voice I/O devices 12.

A numeral 2A indicates a directory server computer for managing telephone numbers assigned to each of the client computers 1 and ID information of the mail box used by a user, 2B a mail server computer for managing a text mail and a voice mail of a user, 3 a voice mail exchanger for enabling registration of a voice mail into a mail server 2B from a telephone 6 and registration of a mail into a voice mail apparatus 5 from the client computers 1, 4 a PBX, and 5 a voice mail apparatus attached to the PBX.

Each of the client computers 1 and each of the server computers 2 are connected to each other by a LAN 7. The voice mail exchanger 3 has an interface connected to the LAN 7 and an interface connected to a telephone line 8 so as connect the client computers 1, the server computers 2, and the PBX 4.

Each of the client computers 1 (1a, 1b) has telephone application modules 20 (20a, 20b) for real time voice communication and mail application modules 21 (21a, 21b) for mail transmission and reception.

Each of the telephone application modules 20 includes a real time voice communication interface module 25, a directory interface module 26, and a mail interface module 27.

The real time voice communication interface module 25 is a module for performing voice communication between the client computers via a LAN interface module 28 and has functions for connecting or disconnecting a call between the client computers, packeting inputted voice information, reproducing a voice packet, and transmitting or receiving a voice packet.

The directory interface module 26 is a module for communicating with a directory server 23 installed in the computer 2A via the LAN interface module 28 and has functions for retrieving a telephone number from a user identifier and retrieving mail control information from a telephone number.

The mail interface module 27 is a module for communicating with a mail server 24 installed in the computer 2B via the LAN interface module 28 and has functions for generating a voice file, performing mail registration processing, and registering a voice mail for an answering machine.

Each of the mail application modules 21 is an application module for transmitting and receiving a normal text mail and voice mail and includes a mail interface module 27 and communicates with the mail server 24 via the LAN interface module 28.

Figures 2, 3:
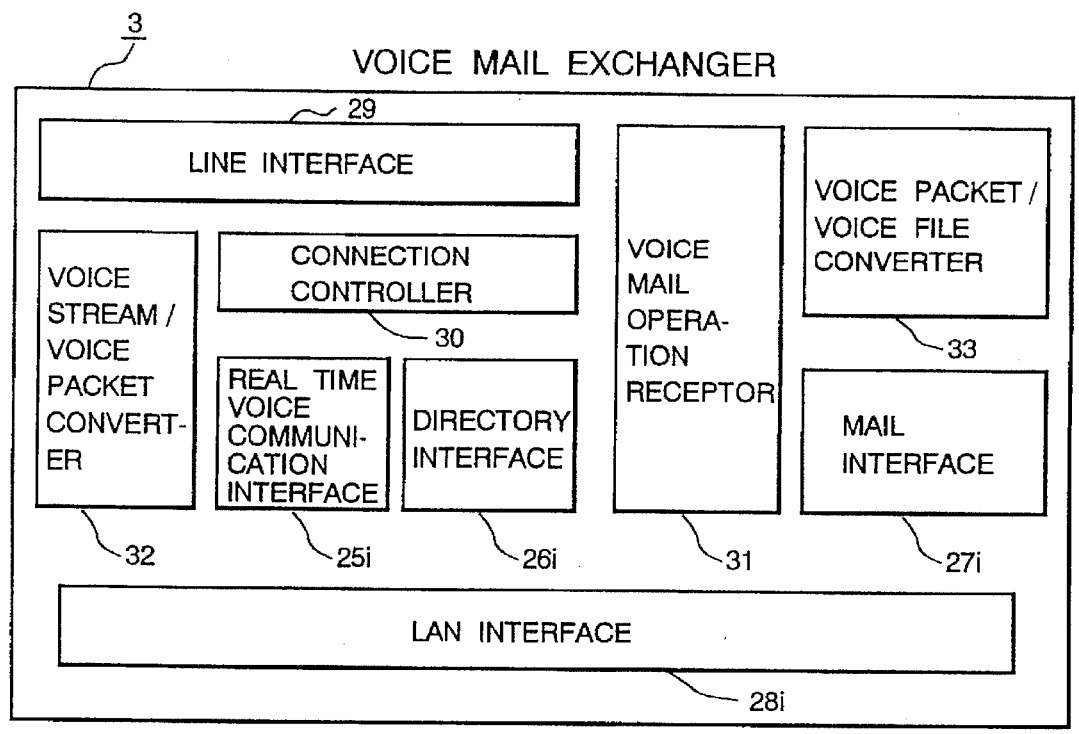
FIG. 2 is a drawing showing the constitution of the voice mail exchanger 3 shown in FIG. 1.
FIG. 3 is a drawing showing an example of information stored in the directory 10 shown in FIG. 1.

The directory server 23, as shown in FIG. 3 for example, manages user discrimination information (user name, etc.), mail control information (mail ID, password, etc.), telephone numbers, and telephone addresses by the directory 10.

The voice mail exchanger 3 comprises a voice communication support block and a voice mail support block between the computers 1 and the telephone 6.

The voice communication support block, as shown in FIG. 2, comprises a line interface module 29, a connection controller module 30, a voice stream/voice packet converter module 32, a real time voice communication interface module 25i, a directory interface module 26i, and a LAN interface module 28i.

The connection controller module 30 is used to convert mutually the PBX connection procedure and the real time voice communication procedure and receives a connection signal from the PBX via the line interface module 29, transfers it to the real time voice communication interface module 25i, and communicates with the client computers 1 via the LAN interface module 28i. Inversely, the connection controller module 30 receives a connection request from the client computers 1 via the real time voice communication interface module 25i and transfers it to the PBX 4 via the line interface module 29.

The voice stream/voice packet converter module 32 converts mutually between the voice stream which is a voice format on the telephone line and the voice packet which is a voice format on the LAN.

The voice mail support block comprises a voice mail operation receptor module 31, a voice packet/voice file converter module 33, and a mail interface module 27i.

The voice mail operation receptor module 31 has a request interpretation function (voice recognition, DTMF (dual tone multi-frequency) detection, etc.) for obtaining information necessary for voice mail registration and reading from a communication partner and operates mails via the mail interface module 27i.

The voice packet/voice file converter module 33 converts mutually between the voice information management format (voice file) of the mail server 24 and the voice packet which is a voice format on the LAN. A voice file fetched from the main box 11 is converted to a voice packet and then converted to a voice stream format in the voice stream/voice packet converter module 32 and flows on the telephone line.

Figure 4:
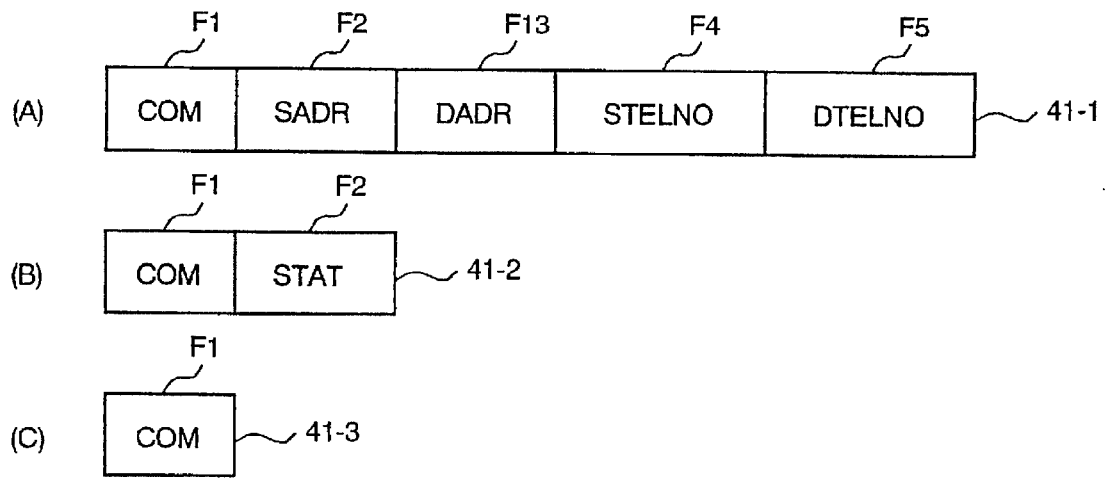
FIG. 4 is a drawing showing the constitution of a connection request packet, a connection response packet, and a disconnection request packet used in the aforementioned communication system.

FIG. 4 shows an example of the format of a real time voice communication procedure packet used by the real time voice communication interface module 25.

A symbol (A) indicates a connection request packet 41-1, which comprises a field F1 indicating packet discrimination information COM, a field F2 indicating an apparatus address SADR of a connection request transmitter, a field F3 indicating an apparatus address DADR of a connection request receiver, a field F4 indicating a telephone number STELNO of a connection request transmitter, and a field F5 indicating a telephone number DTELNO of a connection request receiver.

A symbol (B) indicates a response packet 41-2, which comprises a field F1 indicating packet discrimination information COM and a field F2 indicating connection enabled/disabled information STAT.

A symbol (C) indicates a disconnection request packet 41-3, which comprises a field F1 indicating packet discrimination information COM.

Figure 5:
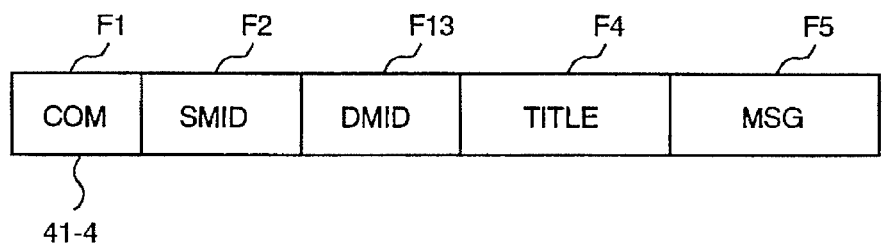
FIG. 5 is a drawing showing the constitution of a mail registration request packet, which is a sequence diagram indicating the registration procedure for a voice mail for an answering machine from a LAN telephone shown in the first embodiment.

FIG. 5 shows the format of a mail registration request packet 41-4 used by the mail interface module 27.

The mail registration request packet 41-4 comprises a field F1 indicating packet discrimination information COM, a field F2 indicating discrimination information (mail ID, etc.) SMID of a mail transmitter, a field F3 indicating discrimination information DMID of a mail receiver, a field F4 indicating title information TITLE expressing the content of a message which is freely set by a mail transmitter, and a field F5 indicating a mail text MSG.

Figure 6:
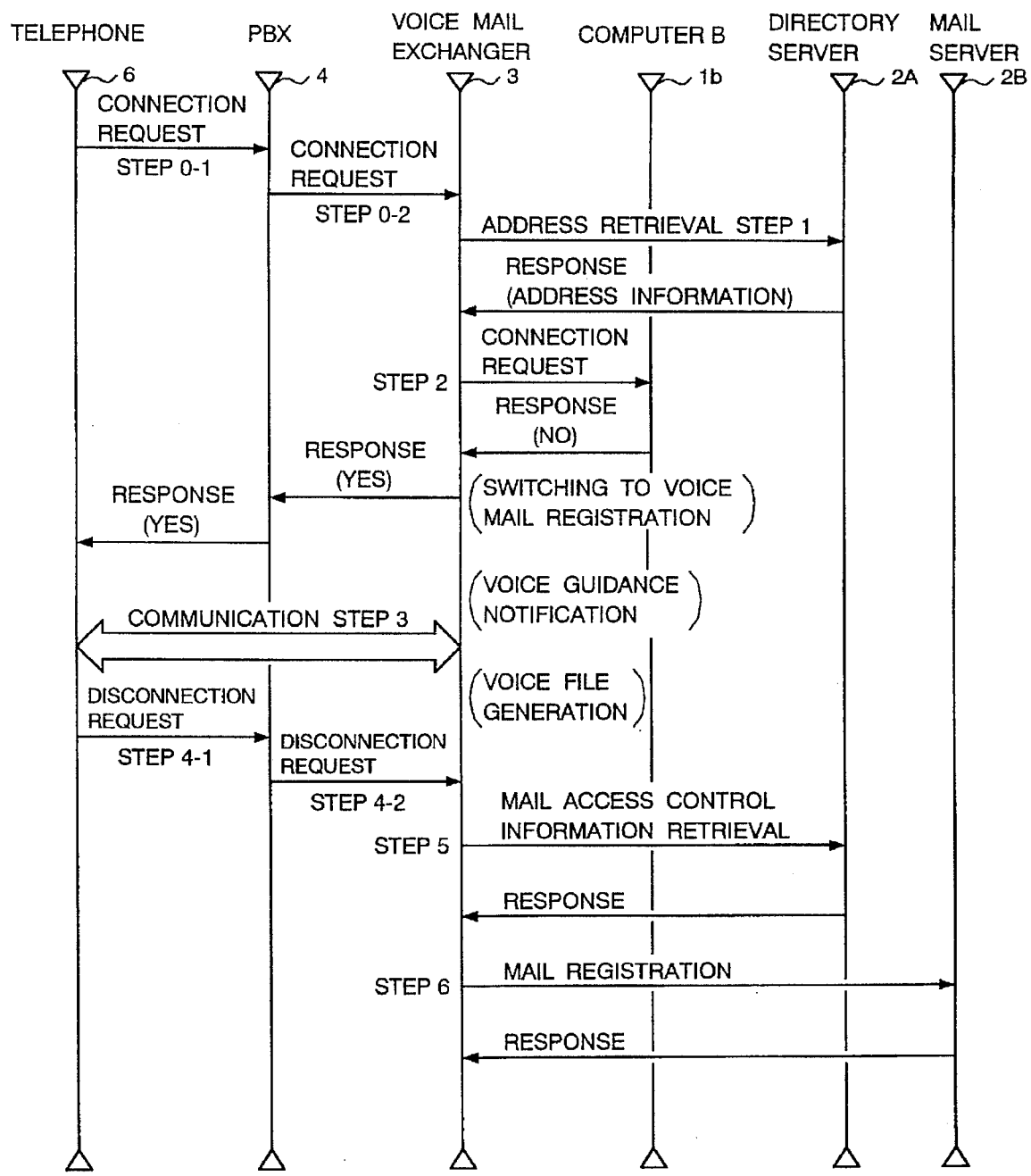
FIG. 6 is a sequence diagram showing the procedure for registering a voice mail for an answering machine from an external telephone in the first embodiment.

Operation Example 1: Registration of a Voice Mail for an Answering Machine from a General Telephone The transmission procedure for a voice mail for an answering machine to a user of the computer B from a user of the telephone 6 will be explained with reference to FIGS. 1 and 6.

A user of the computer B (1b) registers his telephone number in the PBX 4 beforehand so as to connect the line to the voice mail exchanger 3 when a connection request is issued externally to him.

When the user of the telephone 6 makes a telephone call to the user of the computer B according to the normal telephoning procedure, a connection request is issued to the PBX 4 from the telephone 6 (Step 0-1) and the PBX 4 transfers the connection request to the voice mail exchanger 3 (Step 0-2).

The voice mail exchanger 3 transfers the aforementioned connection request to the connection controller module 30 via the line interface module 29. The connection controller module 30 converts the connection request from the telephone 6 to a real time voice communication procedure between the computers which will be described below and connects a call to the user of the computer B.

Firstly, the connection controller module 30 issues an address retrieval request to the directory server 1b (23) (Step 1) on the basis of the telephone number (destination telephone number) of the user of the computer B and obtains the information of the telephone address from the response of the directory server. Next, the connection controller module 30 sends a call connection request to the real time voice communication interface module 25b of the computer B (Step 2) via the real time voice communication interface module 25i. When a connection negative response (NO) is outputted from the real time voice communication interface module 25b of the computer B or the real time voice communication interface module 25i itself judges that the computer B is in the inoperable state, the connection controller module 30 automatically switches the mode to the voice mail registration mode.

In the voice mail registration mode, the connection controller module 30 establishes a call between the PBX and the telephone 6 which is a calling source by returning a positive response to the PBX so as to set a communication state (Step 3) and then starts the voice mail operation receptor module 31 and the voice mail operation receptor module 31 informs the telephone 6 of the voice guidance for requesting registration of a voice mail for an answering machine. When voice information (a voice stream) is inputted from the telephone 6, the connection controller module 30 starts the voice stream/voice packet converter module 32 and converts the input voice stream to a voice packet. The voice packet is transferred to the voice packet/voice file converter module 33 via the voice mail operation receptor module 31 and edited in a voice file. The editing of the voice file is continued until the connection controller module 30 is informed of a disconnection request from the telephone 6.

When the telephone 6 issues the disconnection request and the connection controller module 30 is informed of it (Step 4), the voice mail operation receptor module 31 requests retrieval of mail access control information to the directory server 23 on the basis of the telephone number of the user of the computer B (Step 5) and obtains the control information by the response from the directory server 23. When the mail control information is obtained already at Step 1, Step 5 can be omitted.

Next, the voice file is registered in the mail box 11 of the mail server computer 2B (mail server 24) (Step 6). In this case, information such a display element indicating that the corresponding mail is a voice mail for an answering machine and the telephone number of the calling source for discriminating the mail calling source is added to the mail body in the format of the mail registration request packet 41-4. For example, a mail ID for telephone services is set in the SMID field (F2) and the telephone number of a telephone calling source is set in the TITLE field (F4). For a telephone line other than ISDN, the telephone number of a calling source is generally unknown, so that information indicating that it is a communication request from the telephone line is set in place of the telephone number.

Operation Example 2: Registration of a Voice Mail for an Answering Machine from a Client Computer The transmission procedure for a voice mail for an answering machine to a user of the computer B from a user of the computer A will be explained with reference to FIGS. 7 and 8.

The user of the computer A starts the telephone application module 20a and makes a telephone call to the user of the computer B. If the user of the computer A designates the user of the computer B by a user identifier such as name, when the telephone application module 20a issues an address retrieval request to the directory server 23 (Step 1) and obtains information such as the telephone number of the user of the computer B and the telephone address by a response from the directory server 23, the telephone application module 20a sends a call connection request to the real time voice communication interface module 25b of the computer B via the real time voice communication interface module 25a (Step 2).

When a connection negative response is outputted from the real time voice communication interface module 25b or the real time voice communication interface module 25a itself discriminates that the computer B is in the inoperable state, the telephone application module 20a automatically switches the mode to the voice mail registration mode.

In the voice mail registration mode, the telephone application module 20a issues a mail control information retrieval request to the directory server 23 on the basis of the telephone number of the user of the computer B and obtains the mail control information (Step 3). When the mail control information is obtained already at Step 1, this step can be omitted.

Next, to process a voice mail for an answering machine from the user of the computer A, the mail interface module 27a is started. The mail interface module 27a edits voice information inputted from the voice I/O device 12a in a voice file. When the end of voice input is detected, the voice file is registered in the mail box 11 via the mail server 24 (Step 4). In this case, to discriminate the mail calling source, the mail ID for telephone services is set in the SMID field (F2) of the mail registration request packet 41-4 and the telephone number of the telephone calling source is set in the TITLE field (F4).

Operation Example 3: Reception of a Voice Mail for an Answering Machine

Figures 9, 10:
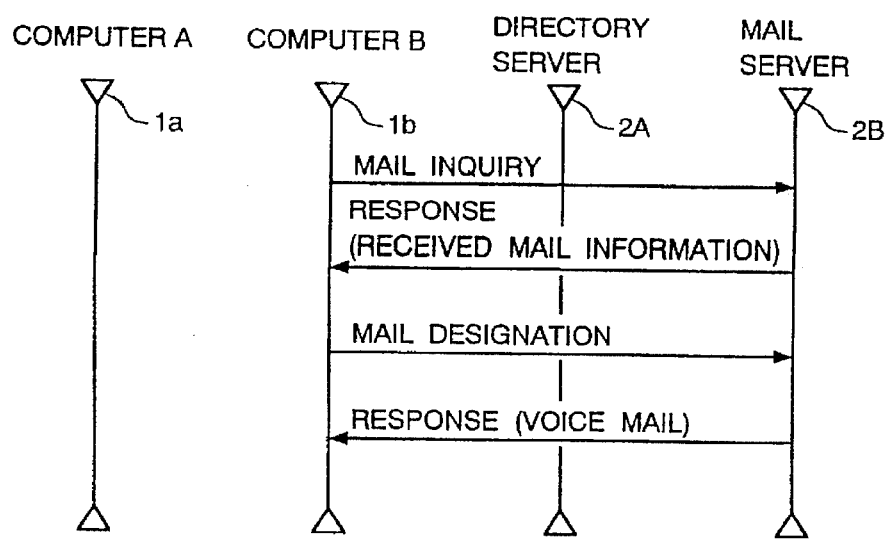
FIG. 9 is a drawing showing an example of an output screen displaying a list of received mails.
FIG. 10 is a sequence diagram showing the procedure for fetching a voice mail from the mail box 11.

The processing procedure when a user of the client computer B receives a voice mail for an answering machine addressed to him which is registered in the main box 11 will be explained with reference to FIGS. 9 and 10.

Figure 7:
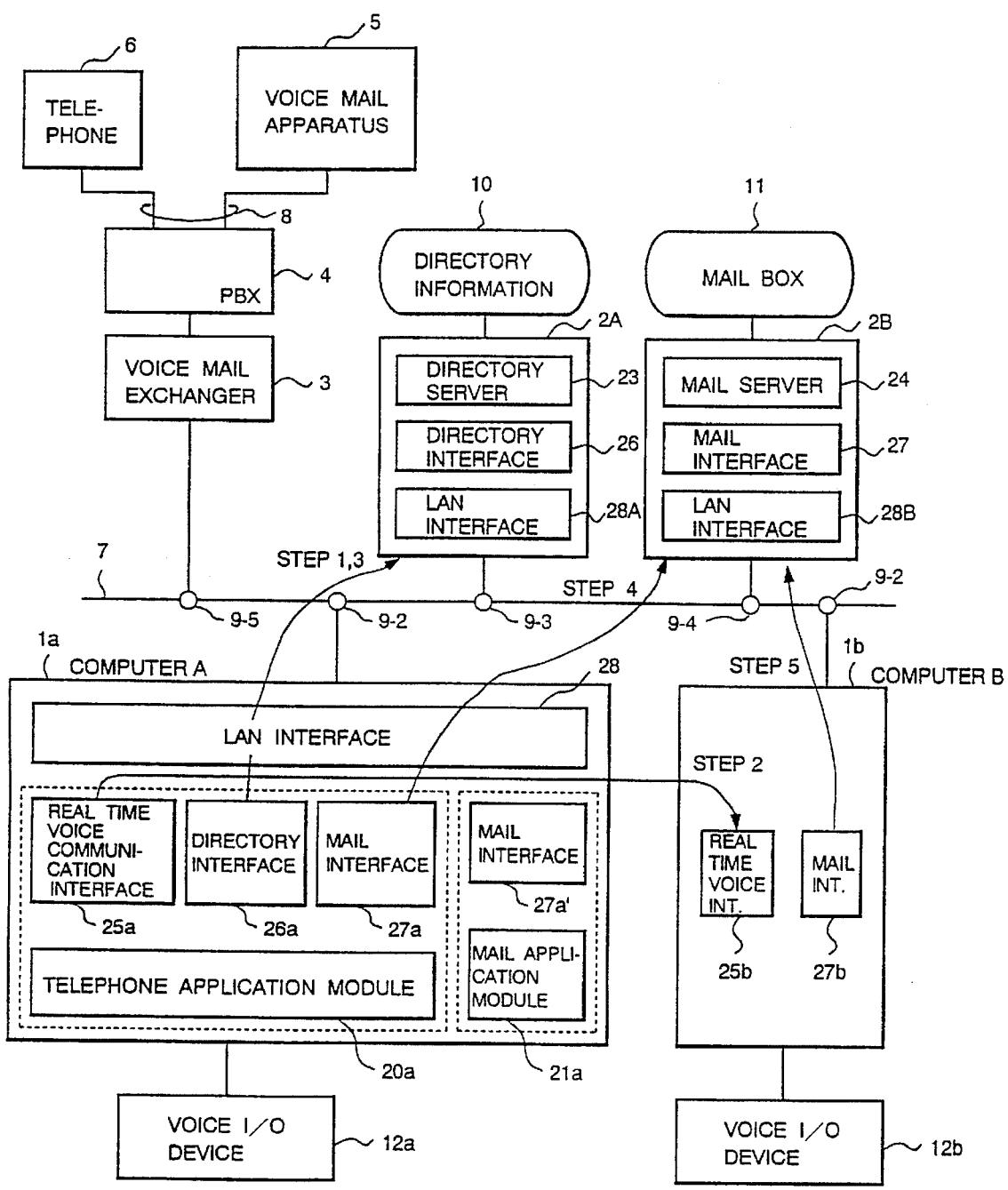
FIG. 7 is a system block diagram for explaining an operation for registering a voice mail for an answering machine from a telephone connected to the LAN in the first embodiment.
Figure 8:
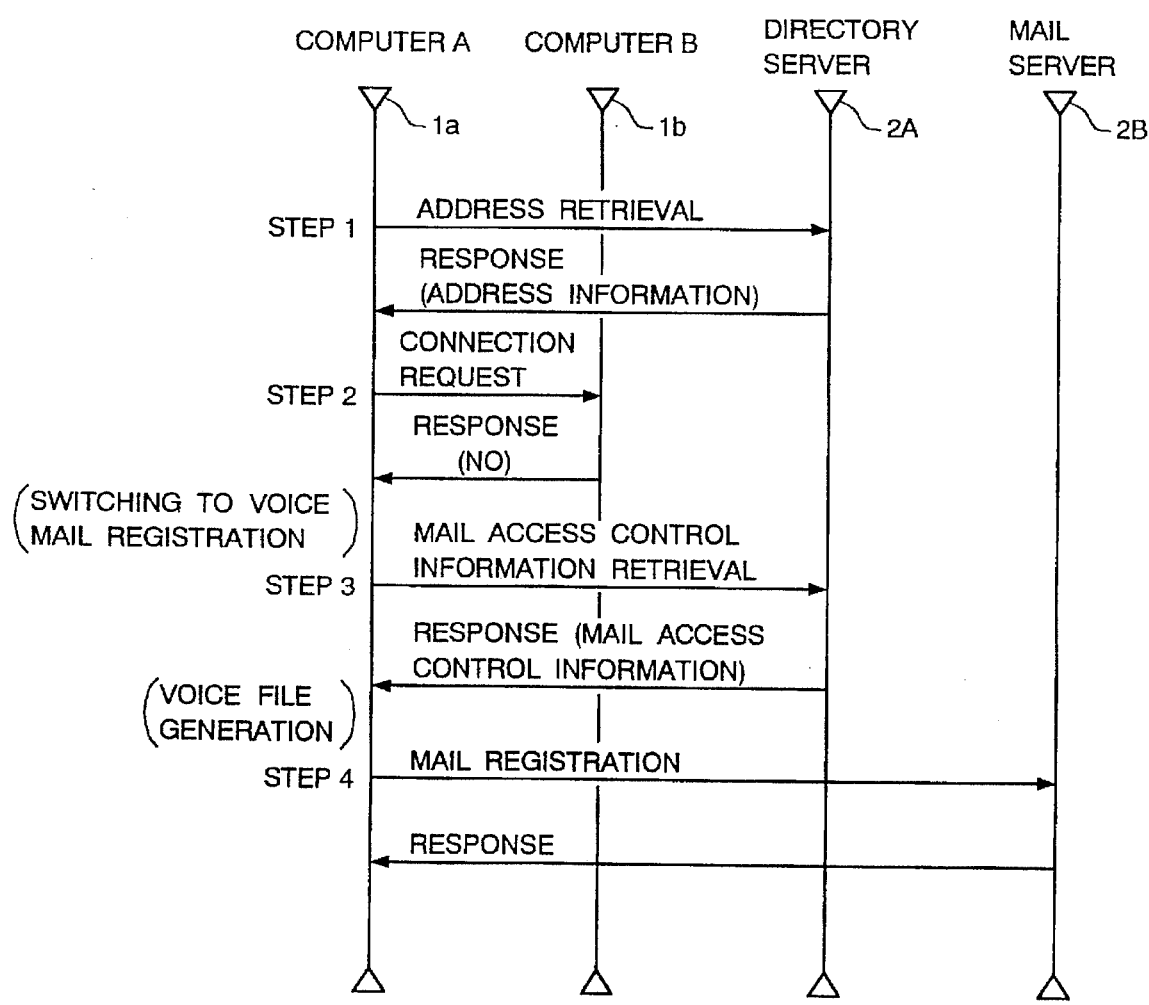
FIG. 8 is a sequence diagram showing the procedure for registering a voice mail for an answering machine from a telephone connected to the LAN in the first embodiment.

The user of the computer B starts the mail application module 21b (not written) and performs the mail reception processing (Step 7 shown in FIG. 1, Step 5 shown in FIG. 7). When the mail server 2B is inquired about a received mail, received mail information is replied from the mail server 2B and the mail application module 21b outputs received mail information 40 on the display screen, for example, in the format shown in FIG. 9. In this example, the received mail information comprises a mail sender display 40-1, a reception date display 40-2, and an attached information 403. In the mail sender display 40-1, a voice mail for an answering machine is distinguished from other mails by a mail ID (SMID of the mail registration request packet) for telephone services. In the attached information display 403, discrimination information (TITLE of the mail registration request packet, telephone number information, or information indicating reception from the telephone line) of a mail sender (telephone calling source).

When the user of the computer B designates the desired mail on the display screen, he can read the voice mail for an answering machine from the mail box by the same operation as that for other normal mails (text) and delete useless mails from the mail box.

Embodiment 2

Figure 11:
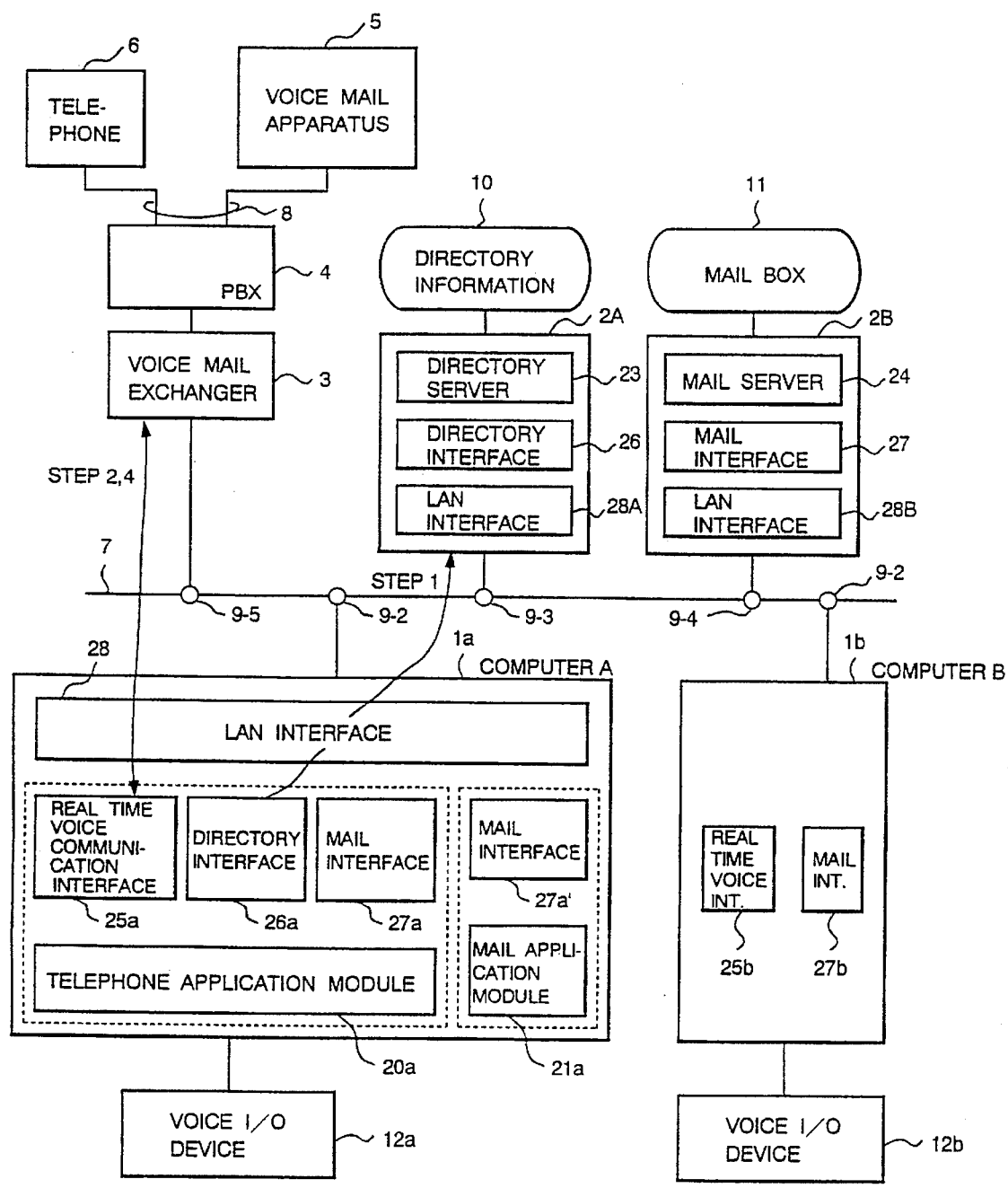
FIG. 11 is a system block diagram showing a second embodiment of the voice/data integrated communication system of the present invention.
Figure 13:
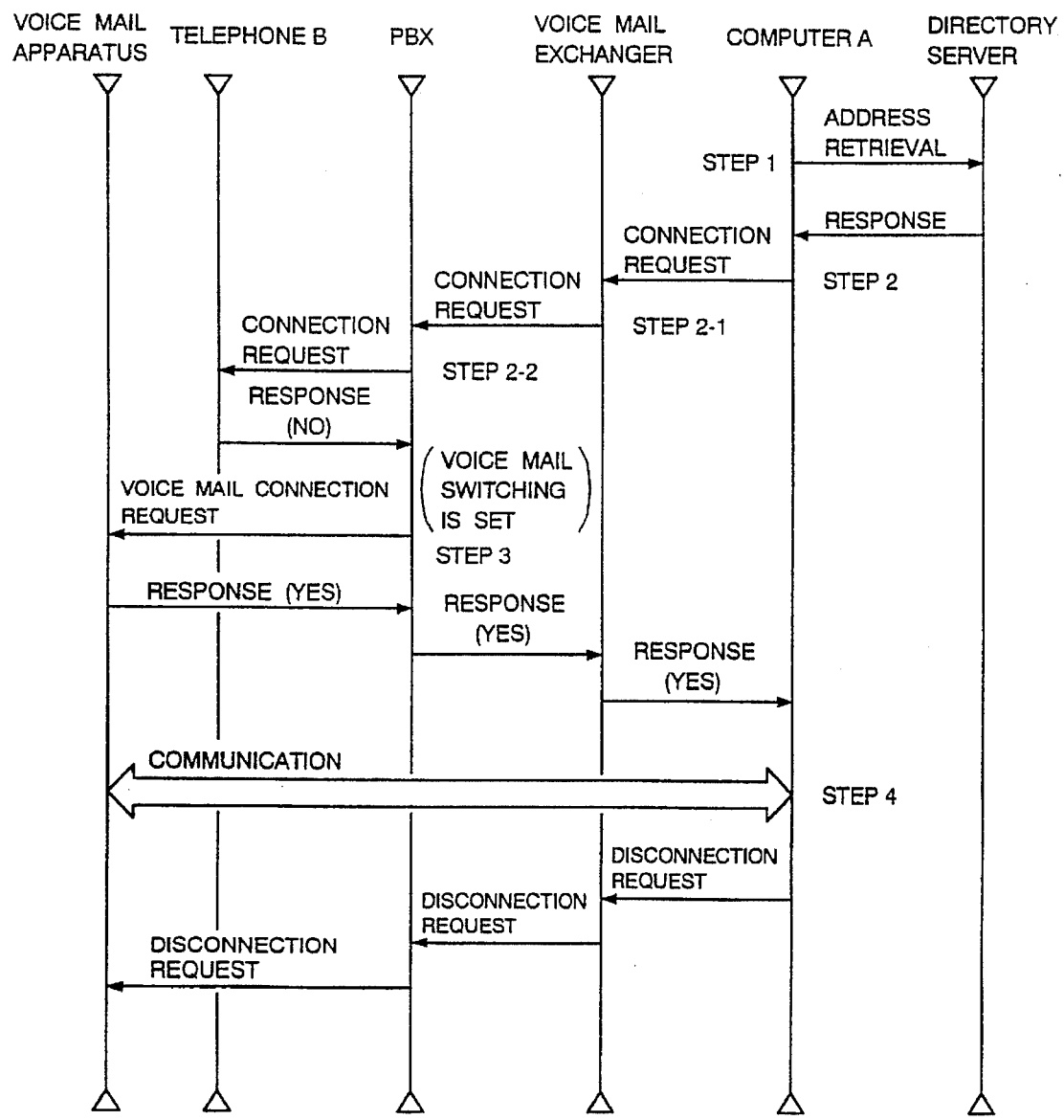
FIG. 13 is a sequence diagram showing the procedure for registering a voice mail for an answering machine from a telephone connected to the LAN in the second embodiment.

In this embodiment, the operation when the client computer A (1a) communicates with the general telephone 6 and the voice mail apparatus 5 will be explained with reference to FIGS. 11, 12, and 13. In this embodiment, as shown in FIG. 12, information (kind of telephone) for discriminating the kind of telephone used by a user is registered in the directory 10.

Operation Example 1: Mail Registration in the Voice Mail Apparatus by a Client Computer Assuming that if the partner user is absent when the user of the computer A makes a telephone call to the user of the telephone 6, the telephone 6 is automatically switched to the voice mail apparatus 5 by the function of the PBX 4, the transmitting procedure for a voice mail for an answering machine will be explained hereunder with reference to FIGS. 11 and 13.

The user of the computer A starts the telephone application module 20a and makes a telephone call to the user of the telephone 6. When the user of the computer A who is a calling source designates the name of the user of the telephone 6 which is a partner by the user identifier, the telephone application module 20a inquires the computer 2A of the directory server 23 about address information on the basis of the user identifier and obtains information such as the telephone number, telephone address, and kind of telephone relating to the user of the telephone 6 (Step 1). When the kind of the telephone of the partner is "general telephone", the telephone application module 20a sends a call connection request to the real time voice communication interface module 25i of the voice mail exchanger 3 via the real time voice communication interface module 25a (Step 2).

The real time voice communication interface module 25i sends the connection request to the connection controller module 30 and the connection controller module 30 converts the connection request to a control signal of the PBX 4 and sends it to the PBX 4 via the line interface module 29 (Step 2-2).

When the partner user is absent (NO is replied), the connection request is automatically switched to the voice mail apparatus 5 by the function of the PBX 4 (Step 3). When the connection controller module 30 is informed of a connection response signal from the voice mail apparatus 5 via the PBX 4, the real time voice communication interface module 25i establishes a call between the voice mail apparatus 5 and the real time voice communication interface module 25a of the computer A (Step 4).

When the voice mail apparatus 5 and the real time voice communication interface module 25a of the computer A enter the communication state, the user of the computer A generates a voice mail according to the interface of the voice mail apparatus 5 and registers it. A voice packet generated by the real time voice communication interface module 25a in this process is converted to a voice stream by the voice stream/voice packet converter module 32 in the voice mail exchanger 3 and then inputted to the voice mail apparatus 5.

Operation Example 2: Fetching a Mail from the Voice Mail Apparatus by a Client Computer The user of the telephone 6 can access the voice mail apparatus 5 from his own telephone 6 according to the normal method which is conventionally known and fetch the voice mail addressed to him. In this embodiment, the procedure when the user of the telephone 6 accesses the voice mail apparatus 5 from the client computer 1 and reads a voice mail for an answering machine will be explained with reference to FIGS. 11 and 13.

When the user starts the telephone application module 20a of the computer A and makes a telephone call to the voice mail apparatus 5, the telephone application module 20a issues an address retrieval request to the directory server 23 on the basis of the destination telephone number (Step 1) and obtains information such as the telephone number, telephone address, and kind of telephone of the voice mail apparatus 5.

When the kind of telephone informed as response information from the directory server 23 indicates a general telephone, the telephone application module 20a sends a call connection request to the real time voice communication interface module 25i of the voice mail exchanger 3 via the real time voice communication interface module 25a (Step 2).

The real time voice communication interface module 25i sends the connection request to the connection controller module 30. The connection controller module 30 converts the connection request to a control signal of the PBX 4 and sends it to the PBX 4 via the line interface module 29 (Step 2-2).

The PBX 4 sends a call connection request signal to the voice mail apparatus 5 (Step 3). When the connection controller module 30 is informed of a connection response signal from the voice mail apparatus 5 via the PBX 4, the real time voice communication interface module 25i establishes a call between the voice mail apparatus 5 and the real time voice communication interface module 25a (Step 4).

When the voice mail apparatus 5 and the real time voice communication interface module 25a of the computer A enter the communication state, the user performs a reception operation of a voice mail according to the interface of the voice mail apparatus 5. A voice packet (a DTMF signal for operating the voice mail apparatus is packeted) generated by the real time voice communication interface module 25a according to input from the user in this process is converted to a voice stream by the voice stream/voice packet converter module 32 and then inputted to the voice mail apparatus 5. The voice stream (voice mail, guidance of the voice mail apparatus, etc.) outputted from the voice mail apparatus 5 is converted to a voice packet by the voice stream/voice packet converter module 32 and sent to the real time voice communication interface module 25a.

Embodiment 3

Figure 14:
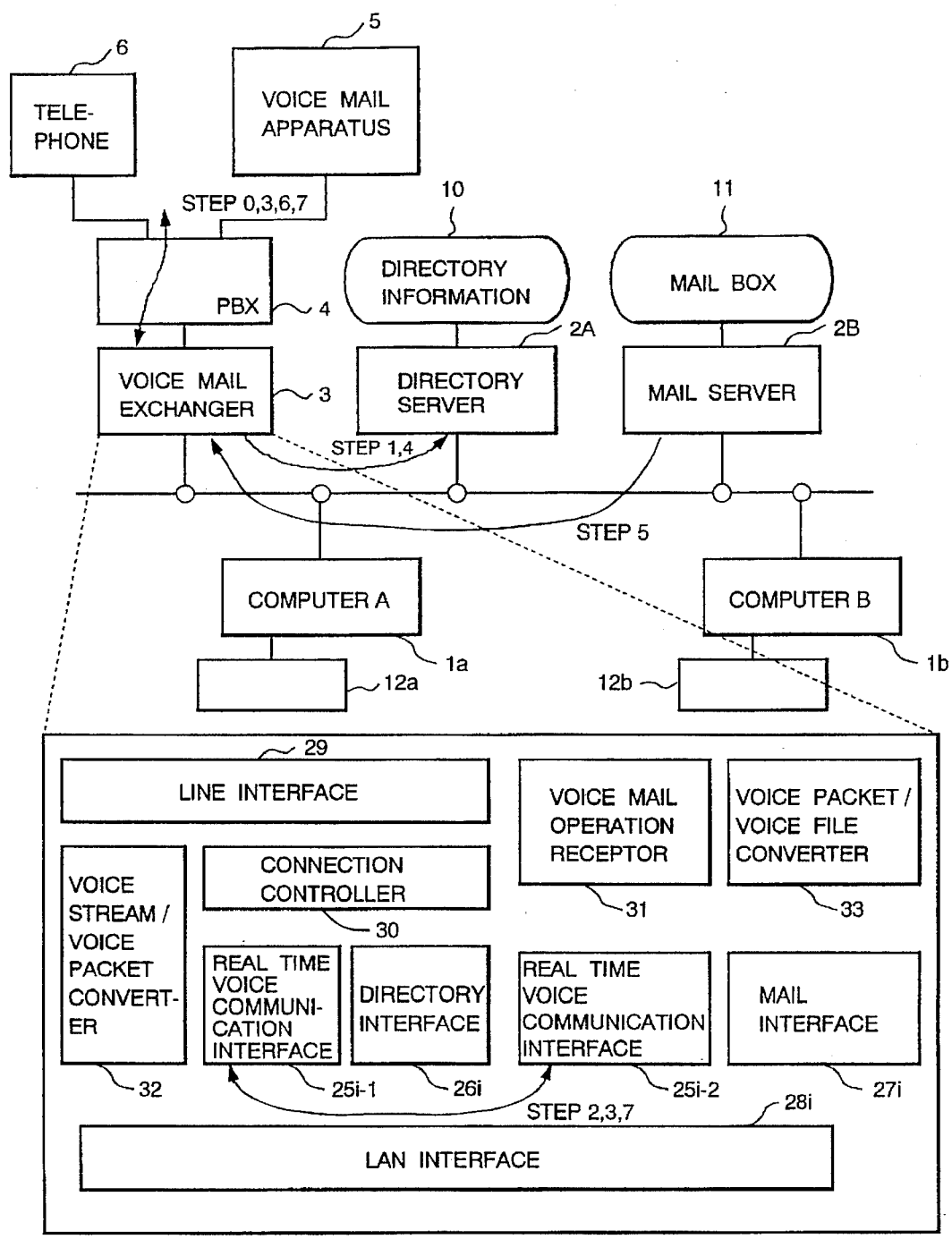
FIG. 14 is a system block diagram showing a third embodiment of the voice/data integrated communication system of the present invention.
Figure 15:
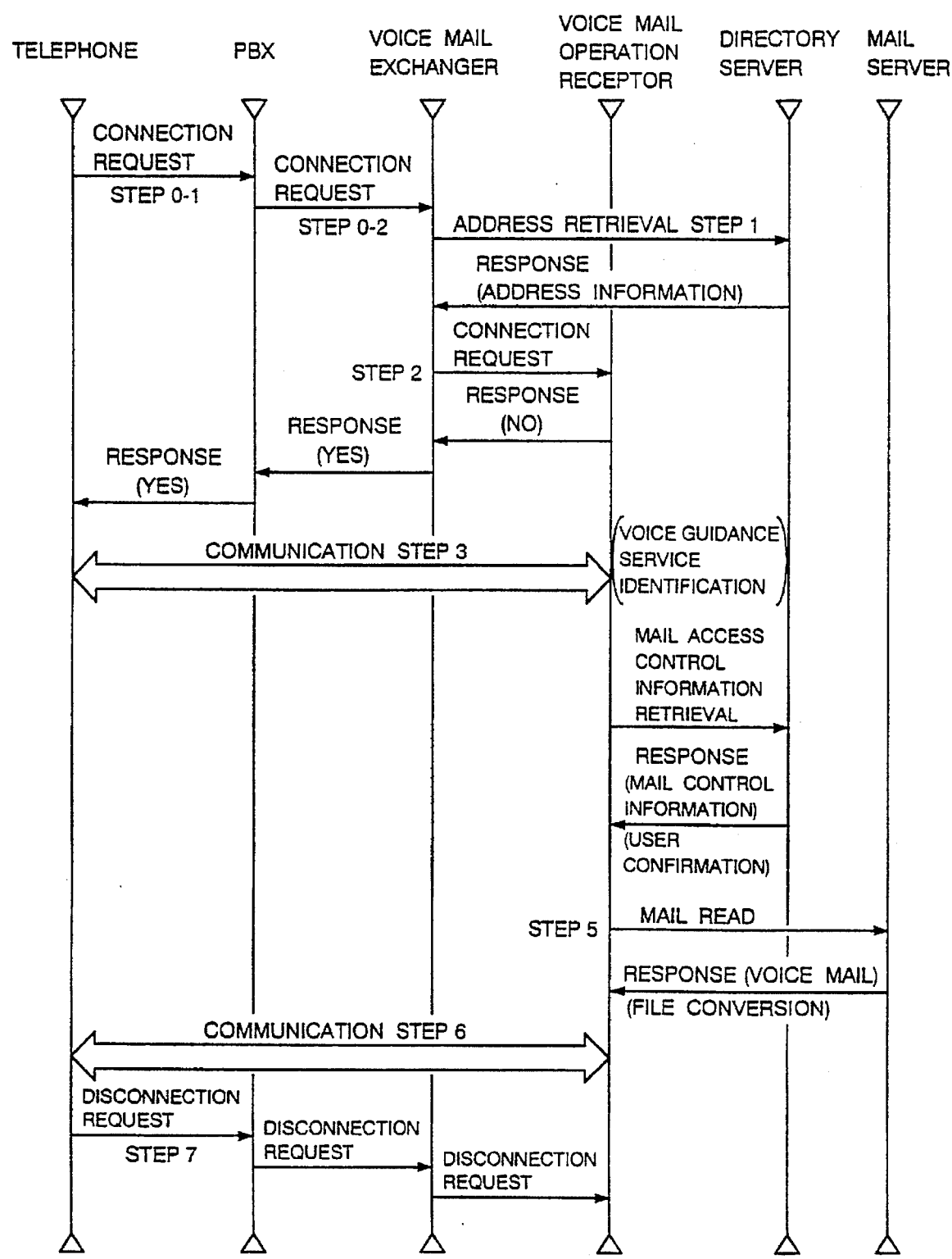
FIG. 15 is a sequence diagram showing the procedure for registering a voice mail for an answering machine from an external telephone in the third embodiment.

In this embodiment, the procedure when a user of a client computer accesses the mail server 2B from the general telephone 6 and reads the voice mail for an answering machine addressed to him which is stored in the mail box 11 will be explained with reference to FIGS. 14 and 15.

In this embodiment, a service program for reading a voice mail for an answering machine is loaded in the voice mail exchanger 3, and a specific telephone number is assigned to this service program, and the specific telephone number is registered in the PBX 4. When a connection request is issued to this telephone number, the PBX connects the line to the voice mail exchanger 3. As to the aforementioned service program of reading a voice mail for an answering machine, discrimination information, telephone number, and telephone address are defined and registered in the directory 10 beforehand. When the mail server 2B is accessed from the general telephone 6, a user makes a telephone call to the aforementioned service program.

When a user makes a telephone call to the service program of reading a voice mail for an answering machine from the telephone 6 according to the normal telephoning procedure (Step 0-1), a connection request from the telephone 6 is received by the voice mail exchanger 3 and transferred to the connection controller module 30 via the line interface module 29 (Step 0-2).

The connection controller module 30 converts the connection request from the telephone 6 to the real time voice communication procedure between the computers and connects a call between the telephone 6 and the voice mail reading service process. Next, the connection controller module 30 issues an address retrieval request to the directory server 23 using the telephone number of the voice mail reading service process as a key (Step 1). When the connection controller module 30 obtains address information by a response from the directory server, it sends a call connection request to the real time voice communication interface module 25i-2 which is addressed via the real time voice communication interface module 25i-1 (Step 2).

When the connection controller module 30 receives a connection response from the real time voice communication interface module 25i-2, it establishes a call between the controller and the telephone 6 so as to set the communication state (Step 3).

The voice mail operation receptor module 31 informs the telephone 6 of the voice guidance of the reading service process of a voice mail for an answering machine. When voice information from the telephone 6 is inputted, the voice mail operation receptor module 31 interprets the inputted information, for example, by using the arts of the voice recognition function and the DTMF detection function and obtains the telephone number of the mail to be read. The voice mail operation receptor module 31 obtains the mail control information corresponding to the telephone number from the directory server 23 (Step 4). If user authentication is necessary, the voice mail operation receptor module 31 performs the authentication processing by checking the data necessary for authentication such as the code number inputted from the telephone 6, for example, with the authentication information registered in the directory beforehand.

Next, using the mail control information, the voice mail operation receptor module 31 fetches the voice file of the corresponding mail from the mail server 24 (Step 5), converts the fetched voice file to a voice packet via the voice packet/voice file converter module 33, and transfers it to the real time voice communication interface module 25i-1. The real time voice communication interface module 25i-1 converts the voice packet to a voice stream using the voice stream/voice packet converter module 32 and informs the telephone 6 of it (Step 6). When the confirmation of the mail ends and the user replaces the receiver, the connection controller module 30 is informed of a disconnection request from the telephone 6 (Step 7). In response to this disconnection request, the real time voice communication interface module 25i-1 of the voice mail exchanger 3 sends a call disconnection request to the real time voice communication interface module 25i-2 and the mail processing ends.

Embodiment 4

In this embodiment, a general telephone is used for real time voice communication, and a computer is used for storetype voice communication, and the mail server on the LAN is used for recording an answering machine.

Figure 16:
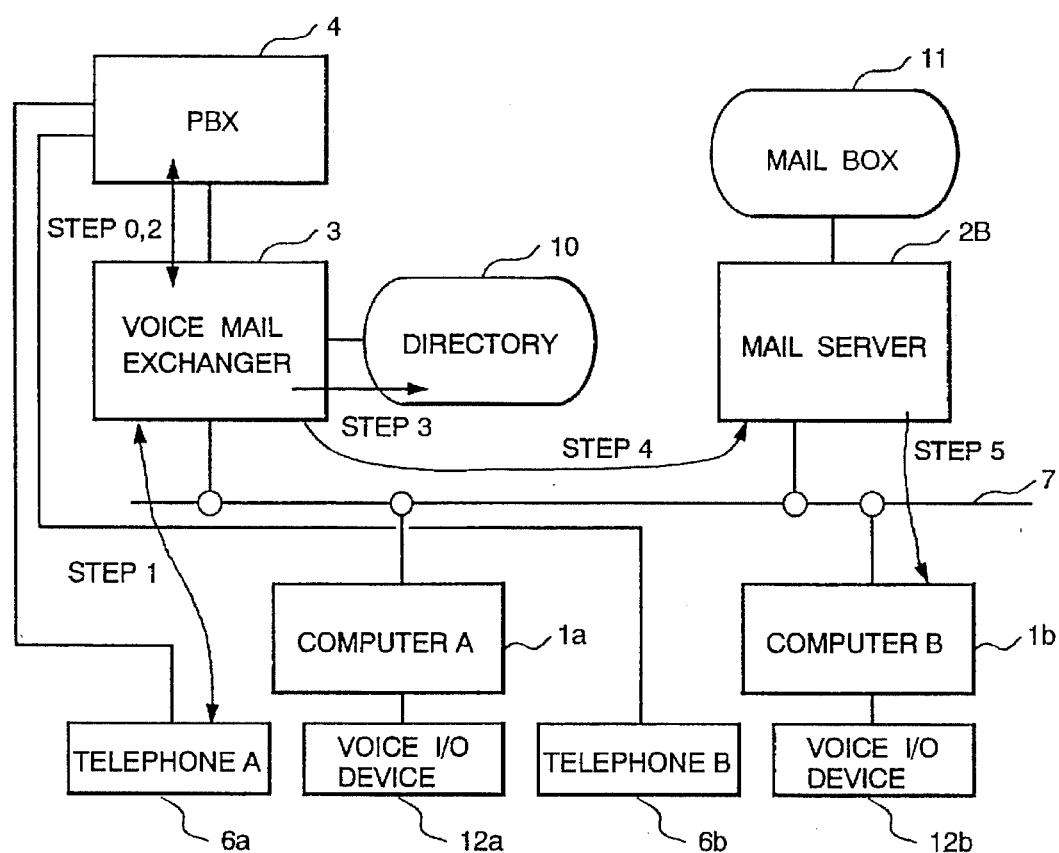
FIG. 16 is a system block diagram showing a fourth embodiment of the voice/data integrated communication system of the present invention.

FIG. 16 is a block diagram of a voice/data integrated communication system of the present invention.

In the drawing, the client computers 1 (1a, 1b) correspond to the telephones 6 (telephone A: 6a, telephone B: 6b) respectively and among the softwares shown in FIG. 1, the function excluding the telephone application module 20a, that is, the function that the mail application module 21 for mail transmission and reception comprising the mail interface module 27 communicates with the mail server 24 via the LAN interface module 28 is provided.

Figure 17:
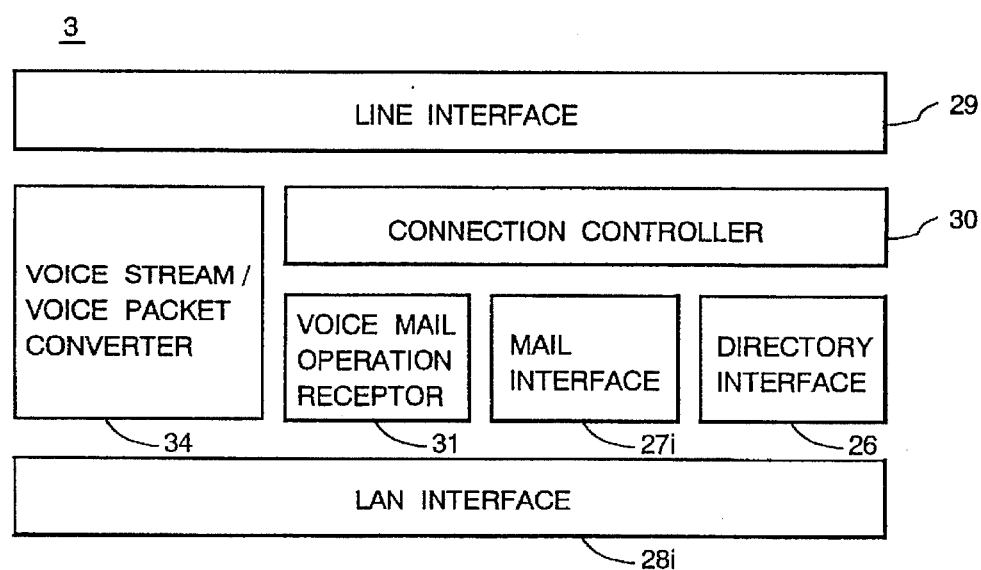
FIG. 17 is a drawing showing the constitution of the voice mail exchanger 3 shown in FIG. 16.

The voice mail exchanger 3 comprises a voice mail support block shown in FIG. 17 and a directory 10 for managing telephone numbers and mail control information (mail ID, password, etc.).

The voice mail support block comprises a line interface module 29, a connection controller module 30, a voice stream/voice file converter module 34, a voice mail operation receptor module 31, a directory interface module 26, a mail interface module 27i, and a LAN interface module 28i.

The connection controller module 30 performs conversion between the PBX connection procedure and the mail registration procedure and transfers a connection signal from the PBX transferred from the line interface module 29 to the voice mail operation receptor module 31. The voice mail operation receptor module 31 obtains mail control information from the telephone number information transferred from the connection controller module 30 and operates a mail via the mail interface module 27i. The voice stream/voice file converter module 33 performs conversion between the voice information management format (voice file) of the mail server 24 and the voice stream which is the voice format on the telephone line 8.

The mail interface module 27i operates a mail using the mail registration request packet 41-4 shown in FIG. 5.

Operation Example 1: Registration of a Voice Mail for an Answering Machine

Figures 18, 19:
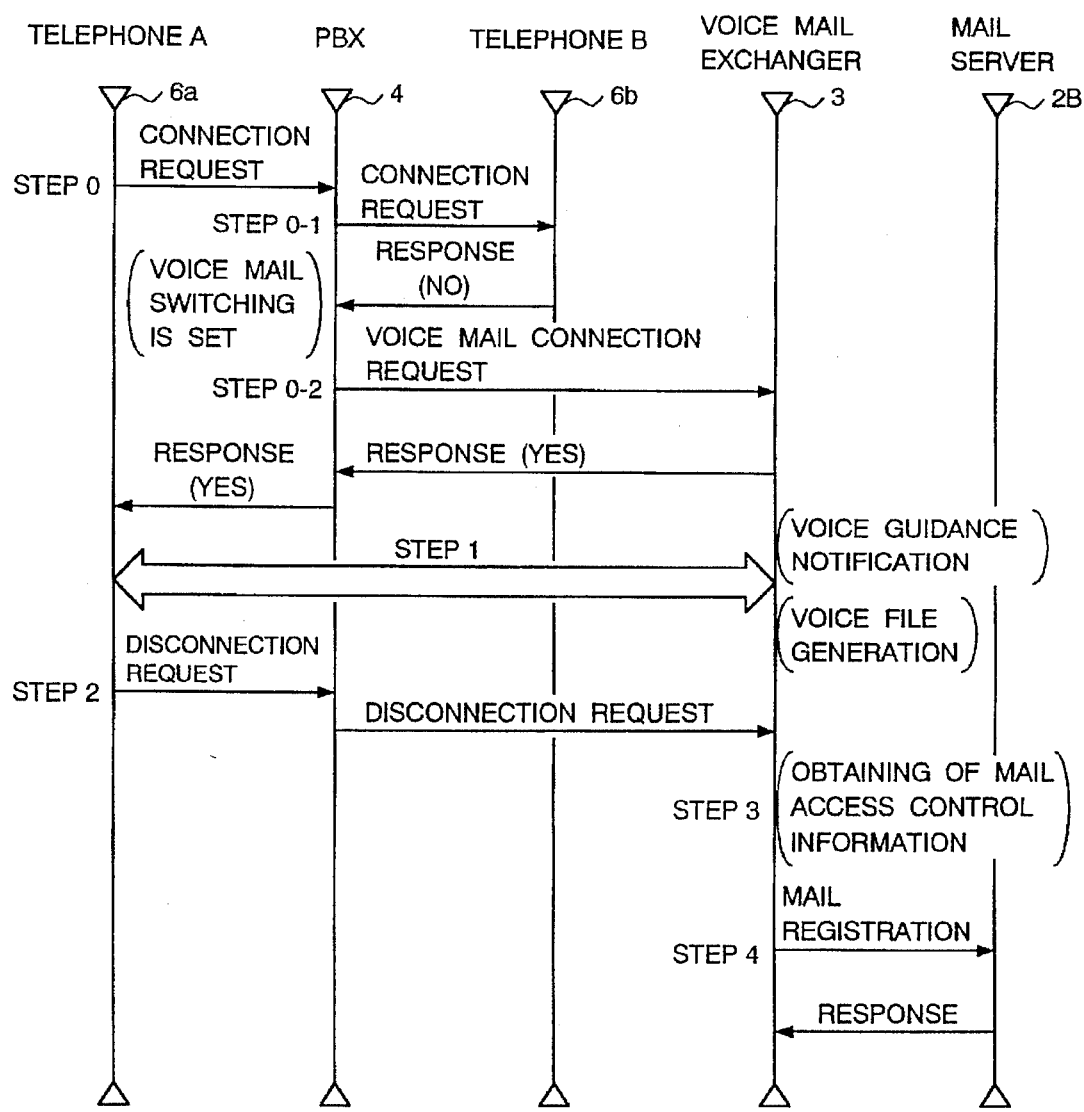
FIG. 18 is a drawing showing the constitution of the directory in the fourth embodiment.
FIG. 19 is a sequence diagram showing the procedure for registering a voice mail for an answering machine from a telephone in the fourth embodiment.

The transmission procedure for a voice mail for an answering machine to a user of the telephone B from a user of the telephone A will be explained with reference to FIGS. 16 and 19.

A private telephone number is assigned to the voice mail exchanger 3 beforehand and the telephone number is registered in the PBX 4. When the user of the telephone B is absent, the PBX 4 automatically connects a connection request to the telephone B to the voice mail exchanger 3. When the user of the telephone A makes a telephone call to the user of the telephone B according to the normal telephoning procedure (Step 0), the PBX transfers the connection request to the telephone B (Step 0-1). When the user of the telephone B is absent (NO is replied), the PBX sends the connection request from the telephone A to the voice mail exchanger 3 (Step 0-2). The connection request is transferred to the connection controller module 30 via the line interface module 29. When the connection controller module 30 sends this connection request to the voice mail operation receptor module 31, a call is established and the system enters the communication state (Step 1).

The voice mail operation receptor module 31 informs the telephone A of the voice guidance for registering a voice mail for an answering machine and edits a voice stream received from the telephone A to a voice file using the voice stream/voice file converter module 34. This processing is continued until a disconnection request is issued from the telephone A. When the telephone A issues a disconnection request and the request reaches the voice mail exchanger 3 (Step 2), the voice mail operation receptor module 31 is informed of the disconnection request via the information connection controller module 30. The voice mail operation receptor module 31 obtains mail control information from the directory 10 on the basis of the telephone number of the user of the telephone B (Step 3), sends the voice file to the computer 2B of the mail server 24 using this mail control information, and registers it in the mail box 11 (Step 4). In this case, the mail ID for telephone services is set in the SMID field F2 of the mail registration request packet 40-4 and the telephone number of the calling source (in the case of a telephone line other than ISDN, the telephone number of the calling source is unknown, so that, in this case, information from which it is found that it is a communication request from the telephone line) is set in the TITLE field F4.

Operation Example 2: Reception of a Voice Mail for an Answering Machine

The procedure for the user of the telephone B to receive a voice mail for an answering machine registered in the mail box 11 from the client computer B (1b) will be explained. The user of the telephone B starts the mail application module 21b and performs the mail reception processing (Step 5). When there is a received mail addressed to him, the mail application module 21b outputs a received mail list on the display screen of the computer B, for example, in the format shown in FIG. 9 on the basis of the received mail information sent from the mail server. By selecting a voice mail for an answering machine from the received mail list, the user of the telephone B can reproduce it by the same operation as that for a general text mail and perform processing such as deletion of processed mails.

According to the aforementioned embodiment of the present invention, the reception processing and deletion processing for a voice mail for an answering machine can be performed by the interface of the conventional mail system, so that a voice mail can be handled easily and a mail can be accessed from any location by properly using a conventional general telephone and a computer (terminal device) for performing real time voice communication by the LAN.

As mentioned above, according to the present invention, the conventional mail system for text can be used as a voice mail apparatus, so that a voice mail system for an answering machine can be provided at a comparatively low price. According to the present invention, a voice mail for an answering machine is managed in the same file format as that for the mail system on the LAN, so that voice information of a voice mail can be reused in common use with another application and the voice based system and the data based system can be integrated.

What is claimed is:

1. A voice mail communication system comprising:

a signal transmission line;

a plurality of terminal devices having a voice mail communication function, connected to said signal transmission line;

mail server means connected to said transmission line for storing a plurality of voice mail messages and managing the addresses of said voice mail messages;

a switch for exchanging voice signals of at least a plurality of telephones connected through a telephone network; and voice mail exchanger means connected to said switch and said transmission line for converting at least a voice data communication protocol of said telephone network to a voice data communication protocol of said transmission line between said telephone network and at least said mail server and one of said terminal devices and for converting at least said voice data communication protocol of said transmission line to said voice data communication protocol of said telephone network.

2. A voice mail system according to claim 1, further comprising:

directory server means connected to said transmission line, for managing the correspondence between the telephone numbers and the addresses of said plurality of terminal devices by mail control information.

3. A voice mail system according to claim 1, wherein each of said voice mails includes information indicating the calling source.

4. A voice mail system according to claim 2, further comprising:

means by which each terminal device connected to said transmission line communicates with said directory server means at the time of voice communication between said terminal devices;

means for requesting telephone connection to a destination device having its device address corresponding to the destination telephone number obtained by said communication with said directory server; and means for registering voice information inputted by a user in said mail server means as a voice mail when said destination terminal device is unconnectable.

5. An integrated mail system, comprising:

a plurality of terminal devices each having a telephoning function and a mail information communication function;

directory server means for managing correspondence between each of telephone numbers of said terminal devices and the addresses of said terminal devices;

mail server means for storing and managing mail information communicated between said terminal devices;

a signal transmission line for connecting said terminal devices and said mail server means;

a switch for taking in a plurality of telephones through a telephone network;

voice mail exchanger means connected between said switch and said transmission line for converting a communication protocol of said transmission line to a communication protocol of said telephone network, and for converting a communication protocol of said telephone network to a communication protocol of said transmission line;

means by which each terminal device connected to said transmission line communicates with said directory server means at the time of voice communication to and from said terminal devices by the telephoning function;

means for requesting telephone connection to a destination device having its address corresponding to a destination telephone number obtained through the communication with said directory server; and means for registering the voice information inputted by a user in said mail server means as a voice mail when said destination device is unconnectable.

6. An integrated mail system according to claim 5, wherein said directory server means comprises:

means for storing mail control information in correspondence with said telephone number; said each terminal device comprising:

means for storing said voice mail in said mail server means on the basis of the mail control information stored in said directory server means.

7. An integrated mail system according to claim 5, wherein said voice mail exchanger means further comprises:

means for switching said communication protocol of said telephone network to a voice mail protocol processing; and means for registering voice information from a telephone into said mail server means as a voice mail.

8. An integrated mail system according to claim 5, wherein said voice mail exchanger means further comprises:

when a connection request is issued to a telephone number of said terminal device from a telephone, means for communicating with said directory server means, for obtaining the device address corresponding to said destination telephone number, and requesting telephone connection to the destination device specified by said device address; and means for switching to the voice mail operation when said destination device is unconnectable and registering voice information inputted from said telephone in said mail server means as a voice mail.

9. An integrated mail system according to claim 8, wherein said directory server means comprises:

means for storing mail control information in correspondence with said telephone number;

said voice mail exchanger means further comprising:

means for registering said voice mail in said mail server means on the basis of the mail control information stored in said directory server means.

10. An integrated mail system according to claim 5, wherein said switch comprises:

voice mail means; and means for registering a voice mail addressed to one of said telephones, in said voice mail means from at least one of said telephones and said terminal devices.

11. An integrated mail system, comprising:

a switch for taking in a plurality of telephones connected through a telephone network;

a signal transmission line;

a plurality of terminal devices connected to said transmission line;

mail server means connected to said transmission line for storing and managing mail information communicated between said terminal devices for each user;

means for requesting voice mail connection to a voice mail exchanger when a destination telephone is unconnectable;

said voice mail exchanger being connected between said switch and said transmission line, and includes:

directory server means for storing the correspondence between a telephone number of each of said terminal devices and a voice mail access control information;

means for registering voice information from a telephone as a calling source, in said mail server means as said voice mail access control information corresponding to a destination telephone number of one of said terminal devices retrieved from said directory server means;

means for giving guidance for voice mail to the telephone as the calling source;

means for editing voice information from the telephone as the calling source in a voice file by said transmission line; and means for registering said voice file in said mail server means as a voice mail using the mail access control information corresponding to the destination telephone number retrieved from said directory server means.

* * * * *